(12) United States Patent
Huff et al.

(10) Patent No.: US 6,884,509 B2
(45) Date of Patent: Apr. 26, 2005

(54) SPECIAL TURF FILLER COMPRISING SILICA PARTICLES

(75) Inventors: Carl L. Huff, Reagan, TX (US); Randolph S. Reddick, Calhoun, GA (US)

(73) Assignee: U.S. Greentech, LLC, Calhoun, GA (US)

( * ) Notice: Subject to any disclaimer, the term of this patent is extended or adjusted under 35 U.S.C. 154(b) by 88 days.

(21) Appl. No.: 10/422,129

(22) Filed: Apr. 24, 2003

(65) Prior Publication Data

US 2004/0214000 A1 Oct. 28, 2004

(51) Int. Cl.[7] .............................. B32B 5/16; B05D 7/24
(52) U.S. Cl. ........................ 428/403; 106/400; 106/482; 106/484; 106/485; 106/823; 427/215; 427/218; 427/221; 428/407
(58) Field of Search ................................. 106/400, 482, 106/484, 485, 823; 427/215, 218, 221; 428/403, 407; 52/309.16, 742.13

(56) References Cited

U.S. PATENT DOCUMENTS

| | | | |
|---|---|---|---|
| 2,106,317 A | | 1/1938 | Dezendorf |
| 2,695,851 A | | 11/1954 | Lodge |
| 2,700,003 A | | 1/1955 | Gundlach |
| 2,934,455 A | | 4/1960 | Dober |
| 3,092,836 A | | 6/1963 | Boggus |
| 3,099,574 A | | 7/1963 | Bernier |
| 3,441,362 A | | 4/1969 | Streck |
| 3,443,492 A | | 5/1969 | Pleass |
| 3,503,771 A | | 3/1970 | Kroyer |
| 3,557,038 A | | 1/1971 | Gebura |
| 3,917,771 A | * | 11/1975 | Basile .......................... 264/35 |
| 4,412,015 A | | 10/1983 | Lustgarten et al. |
| 4,606,963 A | * | 8/1986 | Farrell ........................ 428/150 |
| 4,750,909 A | | 6/1988 | Streck ............................ 8/523 |
| 5,151,123 A | | 9/1992 | Kviesitis ................ 106/287.17 |
| 5,254,364 A | | 10/1993 | Kviesitis ..................... 427/214 |
| 5,264,029 A | | 11/1993 | Kviesitis ................ 106/287.17 |
| 5,411,352 A | * | 5/1995 | Eren ............................ 404/31 |
| 5,458,973 A | * | 10/1995 | Jeffs ........................... 428/402 |
| 5,538,787 A | * | 7/1996 | Nachtman et al. ........... 428/323 |
| 5,583,165 A | | 12/1996 | Kviesitis ..................... 523/131 |
| 5,849,124 A | | 12/1998 | Rusk, Jr. et al. .............. 156/71 |
| 6,235,372 B1 | | 5/2001 | Joedicke ..................... 428/145 |
| 6,238,794 B1 | | 5/2001 | Beesley et al. ............. 428/403 |
| 6,263,633 B1 | * | 7/2001 | Hagenah ...................... 52/596 |
| 6,338,871 B1 | | 1/2002 | Shin ........................... 427/218 |
| 6,443,996 B1 | | 9/2002 | Mihelich et al. ............... 8/522 |
| 6,500,543 B1 | * | 12/2002 | Sakai .......................... 428/406 |
| 6,582,819 B1 | * | 6/2003 | McDaniel et al. .......... 428/402 |
| 6,610,405 B1 | * | 8/2003 | Iriguchi et al. ............. 428/403 |
| 6,630,530 B1 | | 10/2003 | Han |
| 2002/0000648 A1 | | 1/2002 | Morris ........................ 428/15 |

FOREIGN PATENT DOCUMENTS

| | | |
|---|---|---|
| DE | 195 40 623 A1 | 5/1997 |
| WO | WO 03/042293 A1 | 5/2003 |
| WO | WO 2004/056881 | 7/2004 |

OTHER PUBLICATIONS

"Aggregate Filled Acryllic Color System Product Specifications", Brochure by Latexite.*
"Material Safete Date Sheete", Brochure.*
"Advantage Sport Coating Products", Brochure by Van Bros. Inc.*

* cited by examiner

Primary Examiner—H. Thi Le
(74) Attorney, Agent, or Firm—McNair Law Firm, P.A.

(57) ABSTRACT

An aggregate turf filler for use with the turf of athletic fields and landscaped areas which comprise crushed silica sand particles ($SiO_2$) which are substantially round in shape and are sized to be between 12 and 40 mesh. An acrylic based sealer covering the outer surface of each of the silica sand particles. Finally, providing that the silica sand particles have a smooth outer surface, possess an angle of repose of less than 30°, repel water, resist compacting, present no damaging sharp edges when incorporated with the turf and are environmentally safe.

19 Claims, 3 Drawing Sheets

SPECIAL TURF FILLER COMPRISING SILICA PARTICLES

BACKGROUND OF THE INVENTION

The instant invention is directed to a filler for use with artificial surfaces such as athletic playing fields, landscaped public and private areas.

Artificial surfaces for the above stated uses are becoming more and more common for various reasons to include aesthetic appearance, maintenance, evenness of the surface, etc. Fillers for use with such surfaces are also common. Normally such fillers would include sand, crumb rubber and crushed stone. It is also known to color these fillers to enhance the appearance of the surface.

The usual natural and colored fillers have several drawbacks to include mounding and damage to the artificial fiber due to an abrasive cutting action brought about by the sharp edges of sand particles.

It is an object of this invention to provide a filler for artificial turf which will not mound.

Another object of the invention is the provision of filler for artificial turf consisting of rounded granules.

Another object of the invention is the provision of a filler for artificial turf in which each granule is of a restricted size profile.

Another object of the invention is the provision of a filler for an artificial turf surface in which the filler is coated with an acrylic based sealer.

A further object of the invention is the provision of a silica sand filler coated with a colored acrylic based sealer for use with an artificial turf.

Finally, an object of the invention is an artificial turf to include a pile fabric secured in position on the ground and a filler evenly distributed on the surface of said pile fabric with a repose of less than 30° and a resistance to washing away.

The invention is directed to an aggregate turf filler for use with the turf of athletic fields and landscaped areas. The turf may be natural or artificial. The turf filler is composed of:

silica sand particles ($SiO_2$) which are substantially round in shape and are sized to be between 12 and 40 mesh. The particles are coated with an acrylic sealer which seals the outer surface of each of the silica sand particles. So treated the silica sand particles possess an angle of repose of less than 30°, repel water, resist compacting, present no damaging sharp edges when incorporated with the turf and are environmentally safe. The silica sand particles are sized to be within no more than five mesh sizes.

The acrylic coating includes natural color pigment of a selected color which is preferably iron oxide ($FeO_2$) for black and chrome III oxide ($Cr_2O_3$) for green. Other colors may be obtained by blending basic colors. The color pigment and the acrylic based sealer are preferably combined at a ratio of 1 part color pigment to 2 parts acrylic sealer.

The aggregate is evenly applied over the turf to a level of between 0.25 to 2.00 inches.

The invention is also directed to a method of producing an aggregate filler for use with athletic fields and landscaped area which includes the steps of:

(A) forming silica sand particles ($SiO_2$) to be substantially round;

(B) sizing the silica sand particles to be in a range between 12 and 40 mesh;

(C) combining a clear acrylic based sealer and a natural colorant forming a colored acrylic sealer; and (D) mixing the silica sand with the colored acrylic based sealant forming an environmentally safe coated aggregate filler having an angle of repose of less than 30°.

The method further includes providing that the colorant is iron oxide ($FeO_2$) or chrome III oxide ($Cr_2O_3$) and is normally mixed with the acrylic based sealer at a 1 to 2 ratio.

The method also includes spreading the aggregate filler over artificial playing surfaces or landscaped surfaces at a depth which is normally between 0.25 to 2.00 inches.

The method of producing a decorative and environmentally safe aggregate filler also includes:

(A) crushing silica sand into particles;

(B) screening the particles and selecting screened particles to be within five mesh sizes;

(C) blending an acrylic based sealant and a colorant at a ratio of between 0.5–1.5 part colorant and 1.5–2.5 acrylic sealant; and, (D) mixing the blended acrylic based sealer and colorant with the aggregate filler forming a colored aggregate filler.

The method of producing a decorative and environmentally safe aggregate filler including providing an acrylic based sealer consisting of acrylic polymer, mineral spirits, ethylbenzene and xylene and coating silica sand particles sized between 12 and 40 mesh with the sealer.

The use of fillers with both natural and artificial turf areas is well known. Also, the use of colored fillers with both natural and artificial turf areas is well known. The fillers act to provide a more even surface area having acceptable resistance to impact and recovery from impact. Fillers further provide for improved drainage and controlled hardness.

Figure 1:
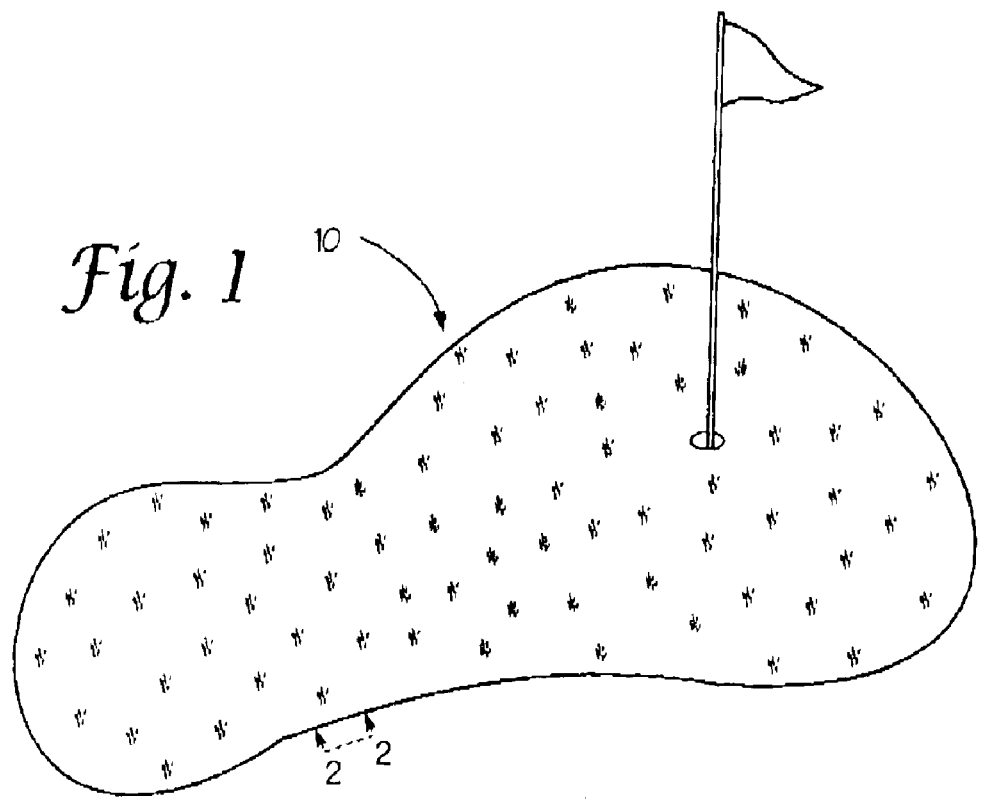
FIG. 1 is a perspective view of a golf green, one of the athletic fields with which the filler of the invention finds use.

Turning now to the drawings, FIG. 1 shows a putting green 10 with which the aggregate filler of the invention may be applied. The aggregate may be of natural color or it may be colored as desired. The putting green may have a natural putting surface or an artificial putting surface. Other surfaces such as soccer fields, football fields, volleyball fields, baseball fields, etc. either natural and artificial, find beneficial results both aesthetically and structurally by using the filler of the invention. Landscaped areas, both natural and artificial, also benefit from the use of the filler of the invention.

Turning now to FIGS. 2–5, there is seen a surface area 12 in which artificial grass-like tufts 14 extend from backing surface 16 in the usual manner. Filler 18, comprising aggregate granules 20, is evenly spread over area 12 to a height of 0.25 to 2.00 inches. It will be noted that granules 20 are substantially round and also are substantially of equal size as better illustrated in FIGS. 3–5. This feature results in the filler resisting compacting because there are no small particles to settle to the bottom. The round and equally sized particles also resist mounding because, so structured, they present an angle of repose of <30°. Note FIG. 3.

Figure 2:
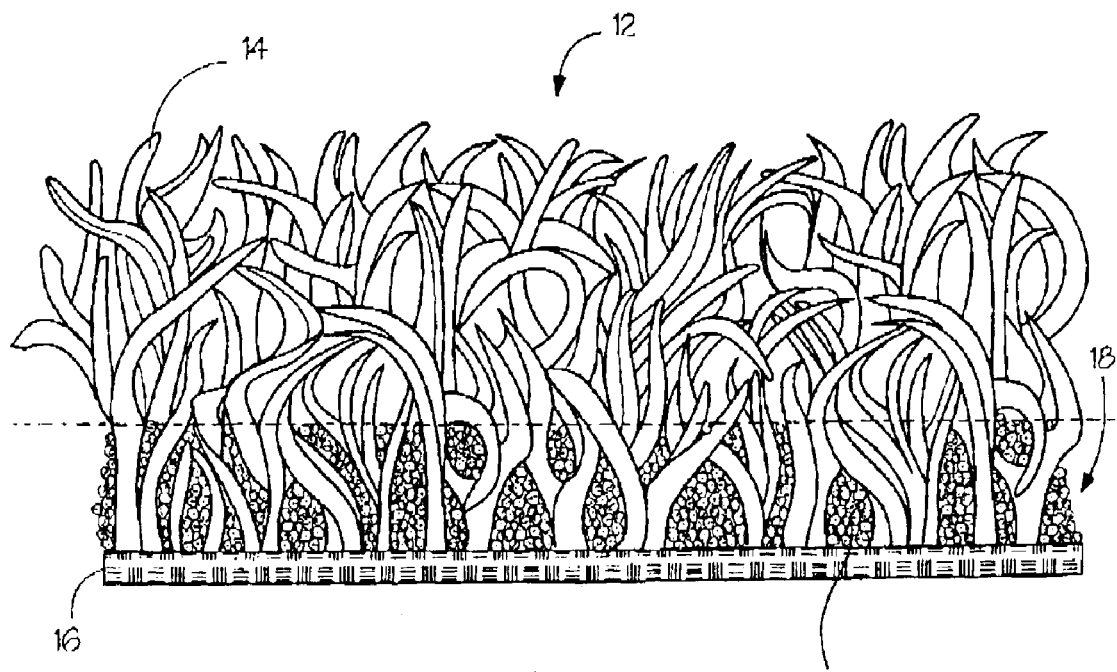
FIG. 2 is a side cutaway view taken along line 2—2 of FIG. 1 of an area incorporating the filler of the invention.
Figure 3:
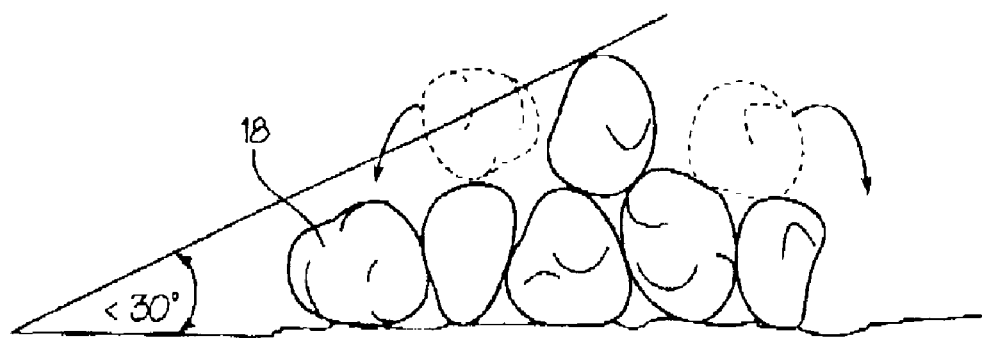
FIG. 3 is a diagrammatic side view showing the filler stacked to its maximum angle of repose, i.e. <30°.
Figure 5:
FIG. 5 is a sectional top view showing the filler disposed among tufts.

The particles arranged and structured as shown in FIGS. 2 and 5 also allow even drainage. Because there are no minute particles in the filler to fill the openings between particles, the particles or granules also resist erosion.

The granules are coated with a sealer and are either of natural color or of a desired color.

The arrangement shown in FIGS. 2 and 5 is equally representative of natural turf areas in which case tufts 14 would comprise natural blades of grass extending from ground surface 16. Filler 18 is distributed as earlier described in either natural color form or colored form.

The filler of the instant invention is formed of silica sand ($SiO_2$) occurs naturally in layers or shelves. It must be crushed into particle or granular form for use as the filler of the instant invention. Normally crushed silica sand granules form in a generally round configuration with few if any sharp edges.

Because particle or granule size is critical to the invention, the crushed particles must be sifted through a screening process. It has been found that granules of a size range of between 12 and 40 mesh are most suitable for use as a filler with the above-described surfaces. Further, the filler should be within five mesh sizes in any one application.

Figure 4:
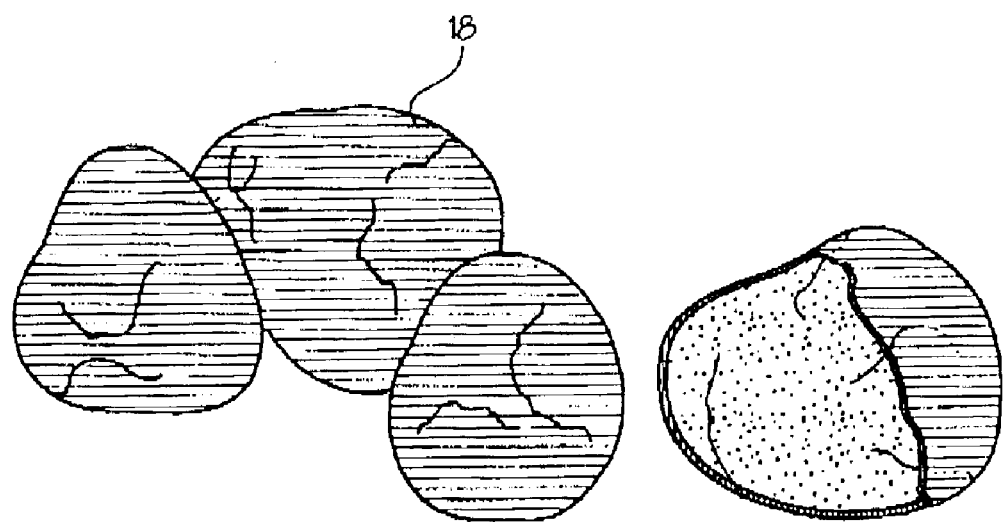
FIG. 4 is an exploded section view of coated silica sand granules.

Granules of silica sand are somewhat porous. In order to eliminate this feature and also to provide the granules with an outer surface which is both water proof and very slick it is desirable that the granules be coated with an acrylic polymer based waterproofing sealer. The coating of choice comprises mineral spirits, xylene, ethylbenzene and acrylic polymer. The acrylic polymer based sealer is clear and therefore, the granules may still have their natural appearance after coating. FIG. 4 shows a cutaway of a coated granule of silica sand. The coating further acts to remove rough edges which may occur over the surface of the particles.

It has also been found that it may be desirable to color the silica sand for a desired aesthetic effect. The colorant of choice is natural pigment in order to ensure that the filler not be a health hazard. Desired colorants for coloring the silica sand is iron oxide ($FeO_2$) for black and chrome (III) oxide ($Cr_2O_3$) for green. Other natural colorants and blends thereof are available should other colors be desired. It has been found, however, that black is the color which most enhances artificial turf or natural turf.

In order to prepare the pigment for application with the silica sand the sealant, is first mixed with the clear acrylic based sealant. The desired ratio for obtaining a mid-range hue is one part colorant to two parts sealer. This ratio may be adjusted to include more or less colorant in order to obtain the desired color depth.

The colorant and the sealer must be thoroughly mixed and applied immediately as the colorant is not soluble and will separate. The aggregate and colored sealer must be thoroughly mixed in order to ensure complete coverage of the aggregate. It is suggested that a cement mixer be used because its aggressive tumbling action prevents clustering of the coated granules. It is preferred that the duration of the mixing or tumbling action is about five minutes. The ratio of sealant/colorant to aggregate is one gallon per ton. Again, more or less sealer/colorant may be used dependent on the desired color and coating desired.

After sealing and coloring the silica sand by blending in the mixer, the granules are discharged onto a drying area. In about five minutes the colored/sealed aggregate is ready for transport to areas of application.

It is noted that the colored/coated silica sand may also be used to decorate cement and masonry structures. Also, they may be used as ground cover. These applications are particularly true of those granules which fall outside the size limits of the turf filler.

What is claimed is:

1. An aggregate turf filler for use with the turf of athletic and landscaped areas said turf filler aggregate comprising:
    substantially round silica sand particles ($SiO_2$) having an angle of repose of less than 30° and sized to be between 12 and 40 mesh;
    an acrylic polymer based sealer including mineral spirits, ethylenebenzene and xylene coating and sealing the outer surface of each of said silica sand particles; wherein,
    said silica sand particles resist mounding, repel water, resist compacting, present no damaging sharp edges when incorporated with said turf and are environmentally safe.

2. The turf filler of claim 1 wherein said silica sand particles are sized to be within no more than five mesh sizes.

3. The turf filler of claim 1 wherein said acrylic polymer coating includes natural color pigment of a selected color.

4. The turf filler of claim 3 wherein said color pigment is one of iron oxide ($FeO_2$) and chrome (III) oxide ($Cr_2O_3$).

5. The turf filler of claim 3 wherein said color pigment and acrylic polymer based sealer are combined at a ratio of 1 part color pigment to 2 parts acrylic polymer based sealer.

6. The turf filler of claim 1 wherein said turf is artificial.

7. The turf filler of claim 1 wherein said turf is natural.

8. The turf filler of claim 1 wherein said aggregate turf filler is evenly applied over said turf to a level of between 0.25 to 2.00 inches.

9. A method of producing an environmentally safe aggregate filler for use with athletic fields and landscaped area comprising:
    forming silica sand particles ($SiO_2$) to be substantially round with an angle of repose of less than 30;
    sizing said silica sand particles to be in a range of between 12 and 40 mesh;
    providing a clear acrylic polymer based sealer and a natural colorant and blending said acrylic polymer based sealer and said colorant forming a colored acrylic polymer based sealer;
    coating said silica sand with said colored acrylic polymer based sealant forming said environmentally safe aggregate filler; and
    accumulating said coated aggregate filler for use within five mesh sizes.

10. The method of claim 9 including providing that said colorant is at least one of iron oxide ($FeO_2$) and chrome (III) oxide ($Cr_2O_3$).

11. The method of claim 9 including blending said colorant and said acrylic polymer based sealer at a 1 to 2 ratio.

12. The method of claim 9 including spreading said aggregate filler over artificial playing surfaces and landscaped surfaces.

13. The method of claim 9 including spreading said aggregate filler over natural playing surfaces and landscaped surfaces to a depth of between 0.25 to 2.00 inches.

14. The method of producing a decorative and environmentally safe aggregate filler including
    crushing silica sand into particles;

screening said particles and selecting screened particles to be within five mesh sizes;

providing an acrylic based sealer which includes mineral spirits, ethylbenzene and xylene and a natural colorant;

blending said acrylic based sealer and said colorant at a ratio of between 0.5–1.5 part colorant, 1.5–2.5 part acrylic sealant;

mixing said blended acrylic based sealer and colorant with said aggregate; and drying said coated and colored aggregate filler.

15. The method of claim 14 including providing said filler have a repose of less than 30° which results in the filler resisting mounding when in use.

16. The method of claim 14 including providing that said colorant is at least one of iron oxide ($FeO_2$) and chrome (III) oxide ($Cr_2O_3$).

17. The method of claim 14 including blending said colorant and said acrylic polymer based sealer at a 1 to 2 ratio.

18. The method of claim 14 including spreading said aggregate filler over artificial playing surfaces and landscaped surfaces.

19. The method of claim 14 including spreading said aggregate filler over natural playing surfaces and landscaped surfaces to a depth of between 0.25 to 2.00 inches.

* * * * *